(12) United States Patent
Maruyama

(10) Patent No.: US 8,228,444 B2
(45) Date of Patent: Jul. 24, 2012

(54) PROJECTOR, CONTROL METHOD AND COMPUTER PROGRAM PRODUCT

(75) Inventor: Shunji Maruyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 12/535,575

(22) Filed: Aug. 4, 2009

(65) Prior Publication Data

US 2010/0033639 A1   Feb. 11, 2010

(30) Foreign Application Priority Data

Aug. 8, 2008  (JP) ................................. 2008-205354

(51) Int. Cl.
*H04N 9/31*  (2006.01)

(52) U.S. Cl. ...................................................... 348/744

(58) Field of Classification Search .................. 348/744, 348/790, 771; 345/619, 87; 353/30, 122; H04N 5/64, 9/31, 5/74, 3/14

See application file for complete search history.

(56) References Cited

U.S. PATENT DOCUMENTS

| | | | |
|---|---|---|---|
| 7,350,923 B2 * | 4/2008 | Olson et al. | 348/744 |
| 2007/0047524 A1 | 3/2007 | Moriya | |
| 2007/0052733 A1 | 3/2007 | Hirabayashi et al. | |
| 2007/0182443 A1 | 8/2007 | Funada | |
| 2008/0178085 A1 | 7/2008 | Miyazaki et al. | |

FOREIGN PATENT DOCUMENTS

| | | |
|---|---|---|
| JP | 11-053026 A | 2/1999 |
| JP | 2007-048211 A | 2/2007 |
| JP | 2007-72150 A | 3/2007 |
| JP | 2007-74347 A | 3/2007 |
| JP | 2007-241261 A | 9/2007 |
| JP | 2008-072338 A | 3/2008 |

* cited by examiner

*Primary Examiner* — Sherrie Hsia

(74) *Attorney, Agent, or Firm* — AdvantEdge Law Group, LLC

(57) ABSTRACT

A projector includes: a storage portion that stores set identification name data describing the set identification name of an adjustment value set including an adjustment value for each set type for projecting images, predetermined character string data describing plural kinds of predetermined character strings usable as the set identification name and menu image data; a projecting portion that projects an identification name setting image showing the plural kinds of predetermined character strings as selectable on the basis of the predetermined character string data and the menu image data; an input portion that inputs identification name setting information describing the character string selected on the identification name setting image; and an update portion that updates the set identification name data on the basis of the identification name setting information.

8 Claims, 10 Drawing Sheets

| IDENTIFICATION NAME | STORAGE AREA | ADJUSTMENT VALUE SET |
|---|---|---|
| Memory1 | 0001 | ... |
| Memory2 | 0002 | ... |
| Memory3 | 0003 | ... |
| ⋮ | ⋮ | ⋮ |
| Memory10 | 0010 | ... |

FIG. 2

| IDENTIFICATION NAME | VALIDITY FLAG | STORAGE AREA |
|---|---|---|
| DVD | 01 | 0001 |
| UserCustom1 | 01 | 0002 |
| Game | 00 | 0003 |

FIG. 3

| CHARACTER STRING |
|---|
| DVD |
| Blu-ray |
| VCR |
| ⋮ |
| Game |

FIG. 4

| VALIDITY FLAG | STORAGE AREA | ADJUSTMENT VALUE SET |
|---|---|---|
| 01 | 0001 | ... |
| 01 | 0002 | ... |
| 01 | 0003 | ... |
| ⋮ | ⋮ | ⋮ |
| 00 | 0010 | ... |

148

| CHARACTER STRING | VALID INPUT SOURCE |
|---|---|
| DVD | S-Video,Video |
| Blu-ray | HDMI |
| VCR | S-Video,Video |
| SDTV | S-Video,Video |
| HDTV | HDMI |
| Cinema | HDMI,S-Video,Video |
| Sports | HDMI,S-Video,Video |
| Music | HDMI,S-Video,Video,PC,USB |
| Cartoon | HDMI,S-Video,Video |
| Game | S-Video,Video,PC,USB |

PROJECTOR, CONTROL METHOD AND COMPUTER PROGRAM PRODUCT

CROSS-REFERENCE

The present application claims priority from Japanese Patent Application No. 2008-205354 filed on Aug. 8, 2008, which is hereby incorporated by reference in its entirety.

BACKGROUND

A projector has a function that stores an adjustment value for an projecting image, such as a color mode value. For example, Japanese Patent Publication No. 2007-74347 describes that plural sets of adjustment values are stored as parameter sets.

However, because the name for identifying each set of adjustment values is fixed in the method in Japanese Patent Publication No. 2007-74347, a user may overwrite or delete the adjustment values by mistake.

In order to solve the problem, a method may be considered that prompts a user to input arbitrary characters and stores it as an identification name in association with the corresponding adjustment value. However, the method requiring a user to input characters one after another may require time and trouble of the user.

SUMMARY

Various embodiments may provide a projector and computer program product which stores an adjustment value for an image more efficiently and properly.

According to at least one embodiment of the disclosure, there is provided a projector including a storage portion that stores set identification name data describing the set identification name of an adjustment value set including an adjustment value for each set type for projecting images, predetermined character string data describing plural kinds of predetermined character strings usable as the set identification names and menu image data, a projecting portion that projects an identification name setting image showing the plural kinds of predetermined character strings as selectable on the basis of the predetermined character string data and the menu image data, an input portion that inputs identification name setting information describing the character string selected on the identification name setting image, and an update portion that updates the set identification name data on the basis of the identification name setting information.

According to at least one embodiment of the disclosure, there is provided a computer program product embodied in a computer readable medium and comprising instructions executable by a computer configured to control a storage portion, a projecting portion and an input portion, the instructions executable to perform functions as a storage control portion that stores in the storage portion set identification name data describing a set identification name of an adjustment value set including adjustment values for each set type for projecting images, a predetermined character string data describing usable plural kinds of predetermined character strings as the set identification name, and menu image data, a projection control portion that causes the projecting portion to project an identification name setting image showing the plural kinds of predetermined character string as selectable on the basis of the predetermined character string data and the menu image data, an input control portion that causes the input portion to input identification name setting information describing the setting of the identification name, and an update portion that updates the set identification name data on the basis of the identification name setting information.

According to this embodiment, the projector projects the identification name setting image showing plural kinds of predetermined character strings as selectable to prompt a user to set an identification name. Thus, a user is allowed to more efficiently set the adjustment value for an projecting image, and the identification name may be stored properly.

The projector further includes a determining portion that determines the input source of an image signal. In this case, the predetermined character string data may include data describing a valid input source for each of the character strings, and the projecting portion that projects the identification name setting image describing the valid character string in the input source from which the image signal may be input among the plural kinds of predetermined character string on the basis of the predetermined character string data, the menu image data, and the determination result on the input source by the determining portion.

Hence, the projector projects the identification name setting image showing a valid character string in the input source. Thus, a user is allowed to set a character string based on the real operating environment as an identification name. Therefore, the user is allowed to set the adjustment value for the projecting image more efficiently, and the identification name may be stored properly.

In this case, the identification name setting image may include a character string setting image for setting an arbitrary character string as the identification name.

Thus, a user may be allowed to set an arbitrary character string as an identification name. Thus, the ease-of-use for users may be improved.

The input portion may input character string setting information describing the setting of the arbitrary character string, and the update portion may update the set identification name data on the basis of the character string setting information.

Thus, the projector may properly store an identification name including an arbitrary character string by a user.

The projector further includes an image adjusting portion that adjusts an projecting image in accordance with the adjustment value set. In this case, the storage portion may store initial identification name data that describes a initial identification name of the adjustment value set. The projecting portion may project an invoke-list image showing the identification name as selectable on the basis of the initial identification name data, the set identification name data, and the menu image data, the input portion inputs selected identification name information describing the selection of the identification name. The image adjusting portion may adjust the projecting image in accordance with the adjustment value set corresponding to the selected identification name on the basis of the selected identification name information.

Thus, a user may select the identification name set by him or her to adjust the projecting image.

In this case, the storage portion may store adjustment value data describing the adjustment value set including set adjustment values. The projecting portion may project on the invoke-list image the identification name corresponding to the adjustment value set including the set adjustment value as selectable and projects the identification name corresponding to the adjustment value set excluding the set adjustment value as unselectable on the basis of the initial identification name data, the set identification name data, the adjustment value data, and the menu image data.

Thus, a user may select the identification name more efficiently in order to adjust the corresponding image.

BRIEF DESCRIPTION OF THE DRAWINGS

Non-limiting and non-exhaustive embodiments of the present disclosure will be described with reference to the accompanying drawings, wherein like reference numbers reference like elements.

FIG. 2 is a diagram showing an example of initial identification name data according to the first embodiment.

FIG. 3 is a diagram showing an example of set identification name data according to the first embodiment.

FIG. 4 is a diagram showing an example of predetermined character string data according to the first embodiment.

DESCRIPTION OF EMBODIMENTS

With reference to drawings, embodiments applying to the projector of the disclosure will be described below. Notably, the embodiments to be described below do not limit the details of the claimed invention at all. Not all of the components of the embodiments below are typically required as the solving means of the claimed invention.

First Embodiment

Figure 1:
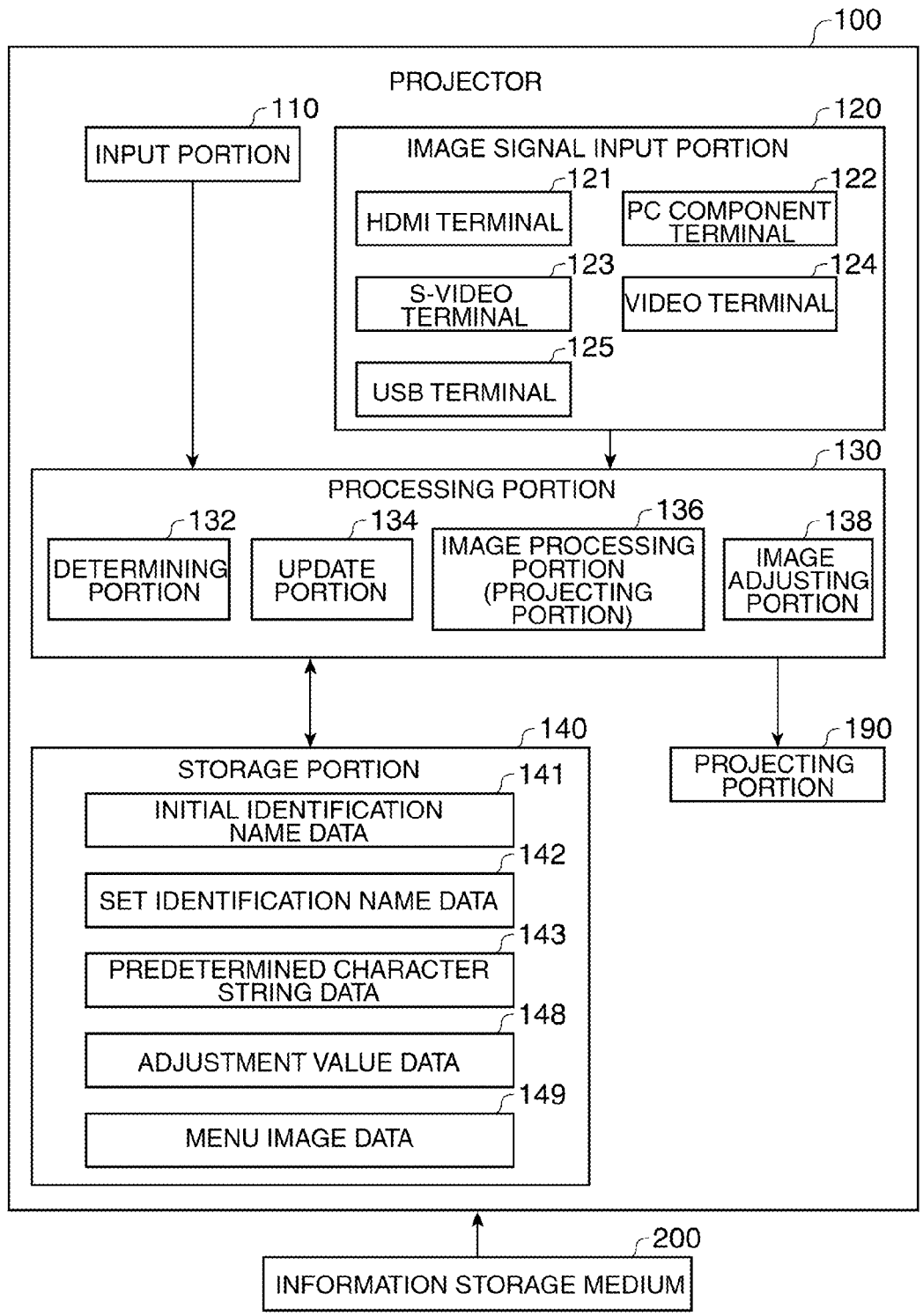
FIG. 1 is a functional block diagram of a projector according to a first embodiment.

FIG. 1 is a functional block diagram of a projector 100 according to a first embodiment. The projector 100 includes an input portion 110 that receives the input of setting information, for example, by a user, an image signal input portion 120 that receives the input of an image signal from a PC (personal computer), a DVD player or a VCR (video cassette recorder), for example, a processing portion 130, a storage portion 140 and a projecting portion 190.

The image signal input portion 120 has an HDMI terminal 121, a PC component terminal (such as mini D-Sub 15 pin terminal) 122, an S-video terminal 123, a video terminal 124, and a USB terminal 125.

The processing portion 130 has a determining portion 132 that determines an input terminal, for example, for an image signal, an update portion 134 that updates data within the storage portion 140, an image processing portion 136 that functions as a part of the projecting portion, and an image adjusting portion 138 that adjusts an image in accordance with an adjustment value. In reality, the image processing portion 136 creates an image (including the adjustment of the color and intensity and keystone correction, for example), and the projecting portion 190 projects the image. However, for simple description, the projecting portion 190 may sometimes be described only as projecting an image in the following description.

The storage portion 140 may store initial identification name data 141 describing a initial identification name of an adjustment value set including adjustment values for set types for projecting images, set identification name data 142 describing a set identification name by a user, predetermined character string data 143 describing usable plural kinds of predetermined character strings as the set identification names, the adjustment value data 148 describing the adjustment values and menu image data 149, for example.

Here, the initial identification name data 141, the set identification name data 142, the predetermined character string data 143 and the adjustment value data 148 will be described in more details.

FIG. 2 is a diagram showing an example of the initial identification name data 141 according to the first embodiment. The initial identification name data 141 is data describing a initial identification name. The initial identification name data 141 may include items of, for example, "IDENTIFICATION NAME", "STORAGE AREA" describing the storage area in associated with an identification name and "ADJUSTMENT VALUE SET" describing a initial adjustment value set associated with the identification name.

Notably, according to this embodiment, storage areas for 10 adjustment value set are provided, and it is assumed that the initial identification names of the adjustment value sets are "Memory 1" to "Memory 10". The adjustment value set may be, for example, data describing the adjustment values for set types (such as the display mode, intensity and contrast) for projecting images. Notably, the number of storage areas is not limited to 10 but may be 9 or lower or 11 or higher.

Next, the set identification name data 142 will be described. FIG. 3 is a diagram showing an example of the set identification name data 142 according to the first embodiment. The set identification name data 142 is data describing the identification name set by a user, for example. The set identification name data 142 includes items of, for example, "IDENTIFICATION NAME", "VALIDITY FLAG" indicating whether the identification name is valid or not, and "STORAGE AREA" indicating the storage area associated with the identification name, for example.

Notably, the value "01" of the "VALIDITY FLAG" indicates a valid identification name, "00" indicates an invalid one. The set identification name data 142 is associated with the initial identification name data 141 on the basis of the "STORAGE AREA".

Next, the predetermined character string data 143 will be described. FIG. 4 is a diagram showing an example of the predetermined character string data 143 according to the first embodiment. The predetermined character string data 143 is data describing usable plural kinds of predetermined character strings as set identification names. The predetermined character string data 143 includes items of, for example, "character string" describing a predetermined character string, for example. Notably, according to this embodiment, it is assumed in the predetermined character string data 143 that 10 kinds of character strings from "DVD" to "Game" are defined as predetermined character strings.

Figures 5, 6:
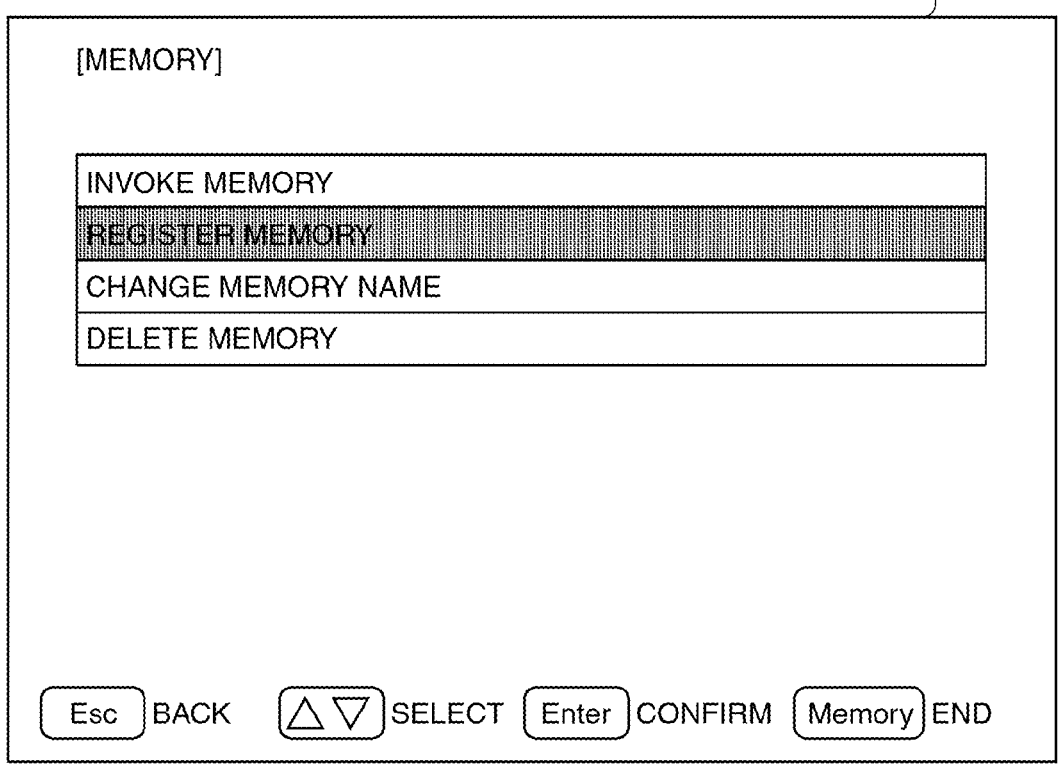
FIG. 5 is a diagram showing an example of adjustment value data according to the first embodiment.
FIG. 6 is a diagram showing an example of a memory image according to the first embodiment.

Next, the adjustment value data 148 will be described. FIG. 5 is a diagram showing an example of the adjustment value data 148 according to the first embodiment. The adjustment value data 148 is data describing the adjustment value set actually defined for each storage area. The adjustment value data 148 includes items of "VALIDITY FLAG" indicating whether a given adjustment value set is valid or not, "STORAGE AREA" indicating the storage area associated with the adjustment value set, and "ADJUSTMENT VALUE SET", for example.

Notably, the functions of the determining portion 132 and others may be implemented in the projector 100 by hardware as follows. That is, the input portion 110 may be a button or a remote controller (or a remote control), for example. The processing portion 130 may be a CPU or an image processing circuit, for example. The storage portion 140 may be a RAM or a flash memory, for example. The projecting portion 190 may be a lamp, a lamp drive circuit, a liquid crystal panel or a lens, for example.

The projector 100 may implement the functions of those components by reading programs from an information storage medium 200. The information storage medium 200 may apply, for example, a CD-ROM, a DVD-ROM, a ROM, a RAM or an HDD, for example.

Next, the processing routines for setting, changing and invoking, for example, the identification name by the projector 100 will be described. FIG. 6 is a diagram showing an example of a memory image 300 according to the first embodiment. If the determining portion 132 determines the operation information describing that a user has pushed a "Memory" key on a remote control has been input from the input portion 110, the determining portion 132 causes the image processing portion 136 and projecting portion 190 to project the memory image 300.

The memory image 300 shows selectable items "INVOKE MEMORY", "REGISTER MEMORY", "CHANGE MEMORY NAME", and "DELETE MEMORY". A user may move a cursor shaded by the thick pattern in FIG. 6 by using an up/down arrow key on the remote control to select an item and push the enter key on the remote control to confirm the selection of the item. Notably, the memory name corresponds to the identification name.

Figure 7:
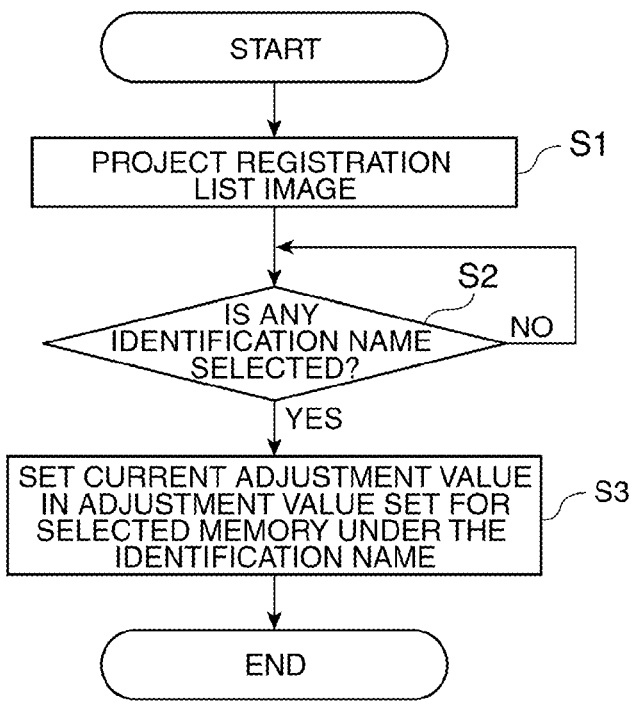
FIG. 7 is a diagram showing an example of the processing routine for registering an adjustment value according to the first embodiment.

It is assumed here that a user has selected "REGISTER MEMORY" after the user adjusts the intensity, for example (that is, the adjustment value set is defined). FIG. 7 is a diagram showing an example of the processing routine for registering an adjustment value according to the first embodiment.

Figure 8:
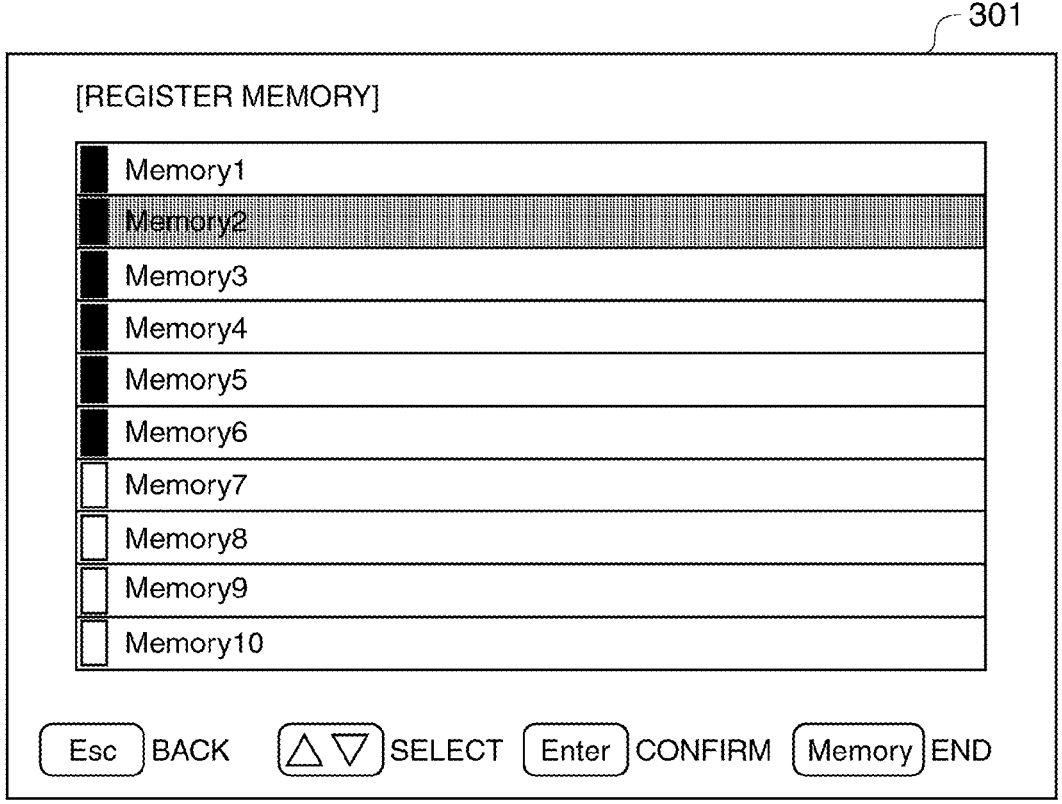
FIG. 8 is a diagram showing an example of a registration list image according to the first embodiment.

If a user selects "REGISTER MEMORY", the projecting portion 190 projects a registration list image (step S1). FIG. 8 is a diagram showing an example of a registration list image 301 according to the first embodiment. The registration list image 301 displays memories "Memory 1" to "Memory 10" as selectable items.

Notably, those having black squares on the left side among "Memory 1" to "Memory 10" have set adjustment values, and those having white squares have no set adjustment values.

The determining portion 132 determines whether any memory has been selected or not on the basis of the operation information from the input portion 110 (step S2).

If some memory has been selected, the update portion 134 sets the current adjustment value in the adjustment value set for the selected memory (under the identification name) (step S3). More specifically, the update portion 134 sets the current adjustment value in the adjustment value set in the storage area corresponding to the selected memory in the adjustment value data 148.

Figure 9:
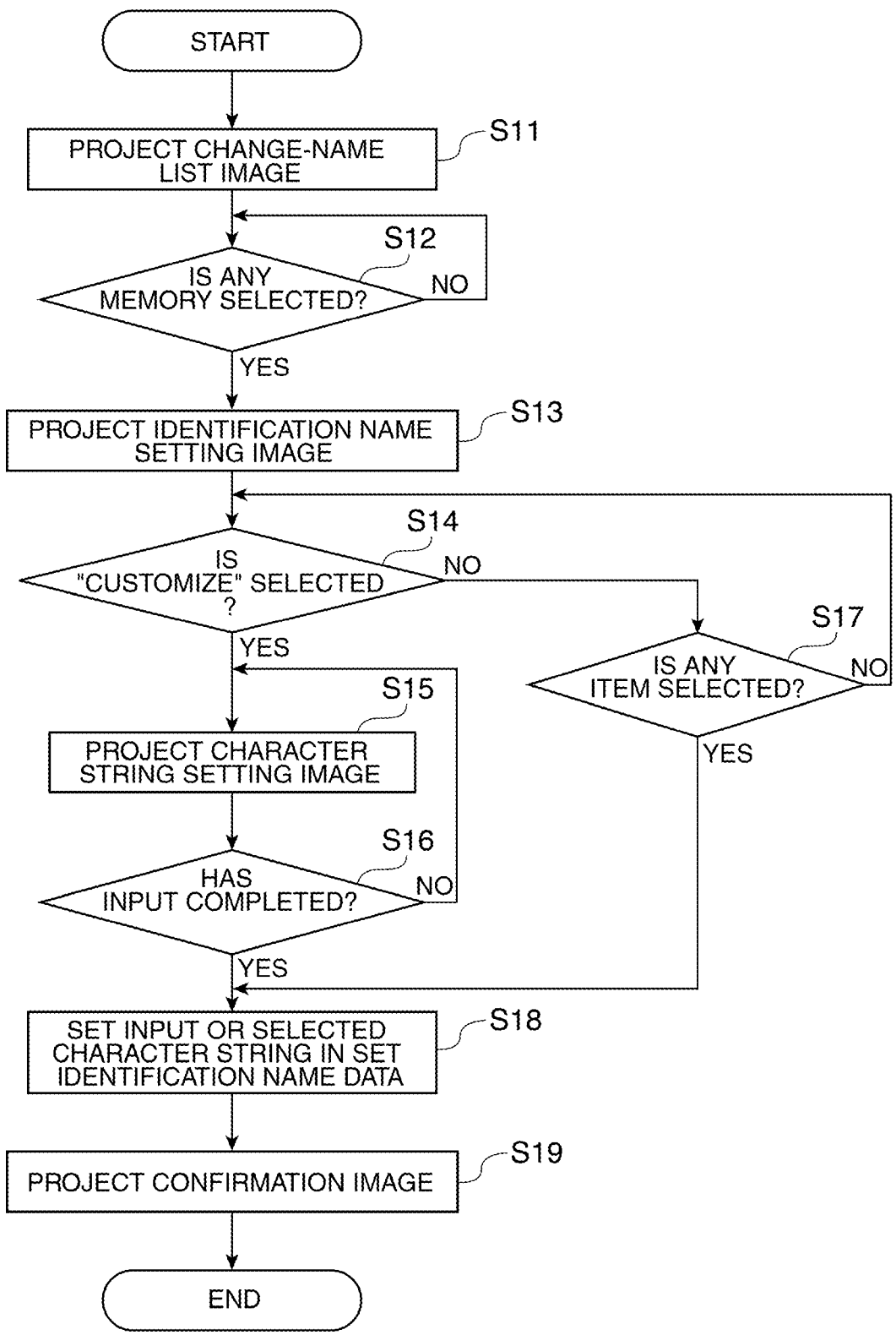
FIG. 9 is a diagram showing an example of the processing routine for changing a memory name according to the first embodiment.

Next, a case will be described where a user selects "CHANGE MEMORY NAME" on the projected memory image 300. FIG. 9 is a diagram showing an example of the processing routine for changing a memory name according to the first embodiment.

Figure 10:
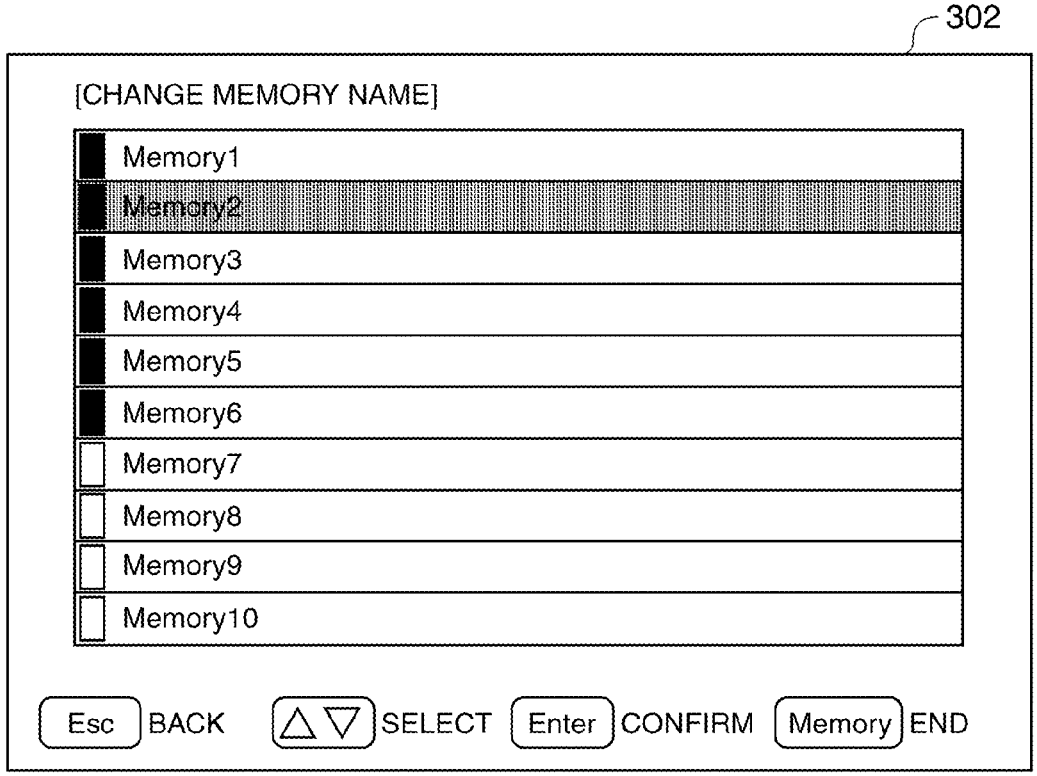
FIG. 10 is a diagram showing an example of a change-name list image according to the first embodiment.

If a user selects "CHANGE MEMORY NAME", the projecting portion 190 projects a change-name list image (step S11). FIG. 10 is a diagram showing an example of a change-name list image 302 according to the first embodiment. The change name list image 302 shows current identification names as memory names.

More specifically, the image processing portion 136 refers to the set identification name data 142. If the "VALIDITY FLAG" of the identification name is "01", the identification name is used. If the "VALIDITY FLAG" is "00", the identification name in the initial identification name data 141 is used. It is assumed that the change-name list image 302 shown in FIG. 10 has all "validity flags" of the set identification name data 142 as "00".

The determining portion 132 determines whether any memory has been selected or not on the basis of the operation information from the input portion 110 (step S12).

If some memory has been selected, the projecting portion 190 projects the identification name setting image (step S13). More specifically, for example, the image processing portion 136 may create an identification name setting image showing plural kinds of predetermined character strings as selectable on the basis of the predetermined character string data 143 and menu image data 149. The projecting portion 190 projects the identification name setting image.

Figure 11:
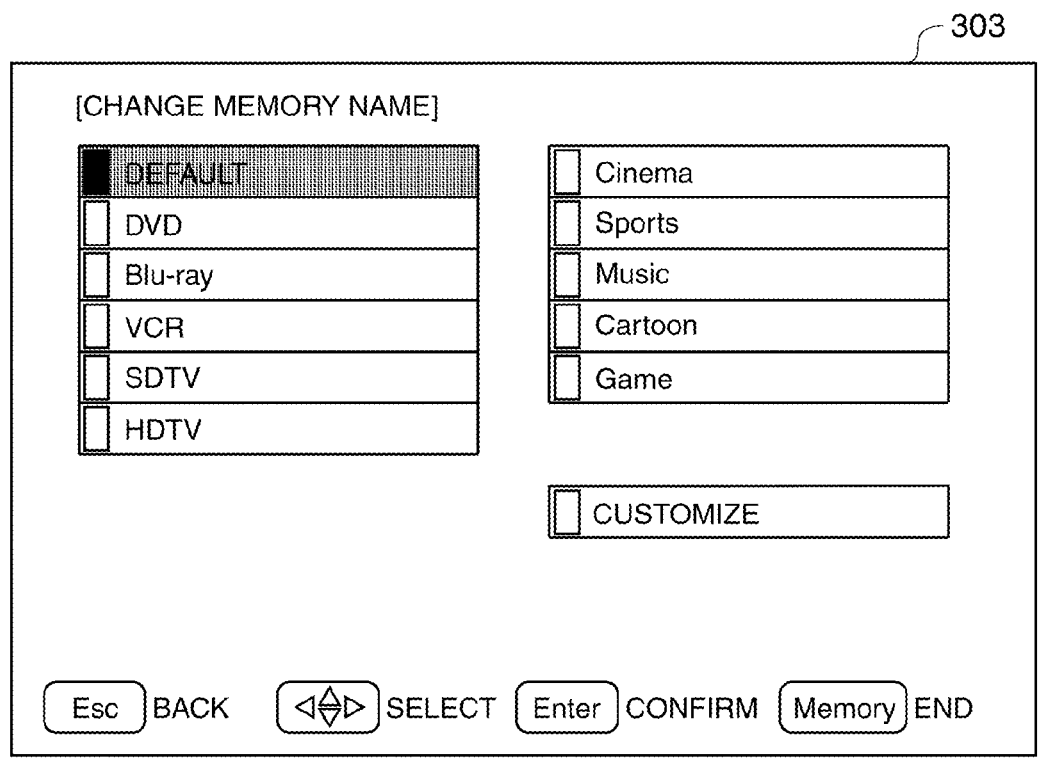
FIG. 11 is a diagram showing an example of the identification name setting image according to the first embodiment.

FIG. 11 is a diagram showing an example of an identification name setting image 303 according to the first embodiment. The identification name setting image 303 shows "CUSTOMIZE" for setting an arbitrary character string as an identification name as a selectable item, such as "default" for setting a initial identification name and "DVD" for setting an identification name described by the predetermined character string data 143.

A user may select a desirable item by pushing up/down and/or left/right arrow keys on a remote control. The determining portion 132 determines whether "CUSTOMIZE" is selected or not on the basis of the operation information from the input portion 110 (step S14).

Figure 12:
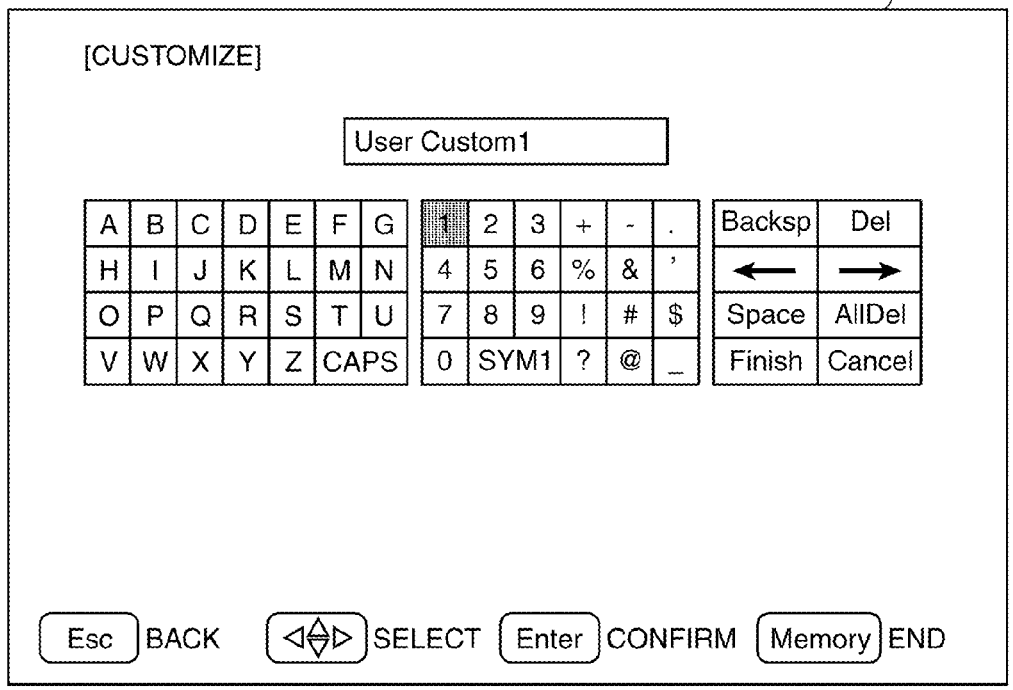
FIG. 12 is a diagram showing an example of a character string setting image according to the first embodiment.

If "CUSTOMIZE" has been selected, the projecting portion 190 projects a character string setting image (step S15). FIG. 12 is a diagram showing an example of a character string setting image 304 according to the first embodiment.

The character string setting image 304 may show an character string input field (having the input of "User Custom1" in FIG. 12) showing the character string being input, alphabets "A" to "Z", numbers "0" to "9", symbols such as "@" and function keys such as "CAPS", for example. Under the condition shown in FIG. 12, for example, the cursor is positioned at "1". By pushing "Enter" key on the remote control by a user, "1" is input in the input character string field. The user may select "Finish" on the character string setting image 304 or push the "Memory" key on the remote control to complete the input of the character string.

The determining portion 132 determines whether the input of the character string has completed or not on the basis of the operation information (such as the character string setting information describing the setting of an arbitrary character string) from the input portion 110 (step S16).

On the projected identification name setting image 303, the determining portion 132 determines whether an item (such as "DVD") excluding "DEFAULT" and "CUSTOMIZE" is selected or not (step S17) on the basis of the operation information (such as identification name setting information describing the setting for an identification name) from the input portion 110.

The update portion 134 sets the character string input in step S16 or the character string selected in step S17 in the set identification name data 142 (step S18). More specifically, in the set identification name data 142, the update portion 134 updates the identification name for the storage area corresponding to the memory selected on the change-name list image 302 to the input character string (such as "User Custom1") or the selected character string (such as "DVD" and "VCR") and sets the "VALIDITY FLAG" for the storage area to "01(valid)".

For example, in the example shown in FIG. 10 to FIG. 12, the input character string is "UserCustom1" for "Memory 2". Therefore, in the set identification name data 142, as shown in FIG. 3, the "IDENTIFICATION NAME" for the storage area 0002 is updated with "User Custom1", and the "VALIDITY FLAG" for the storage area 0002 is updated with "01".

Figure 13:
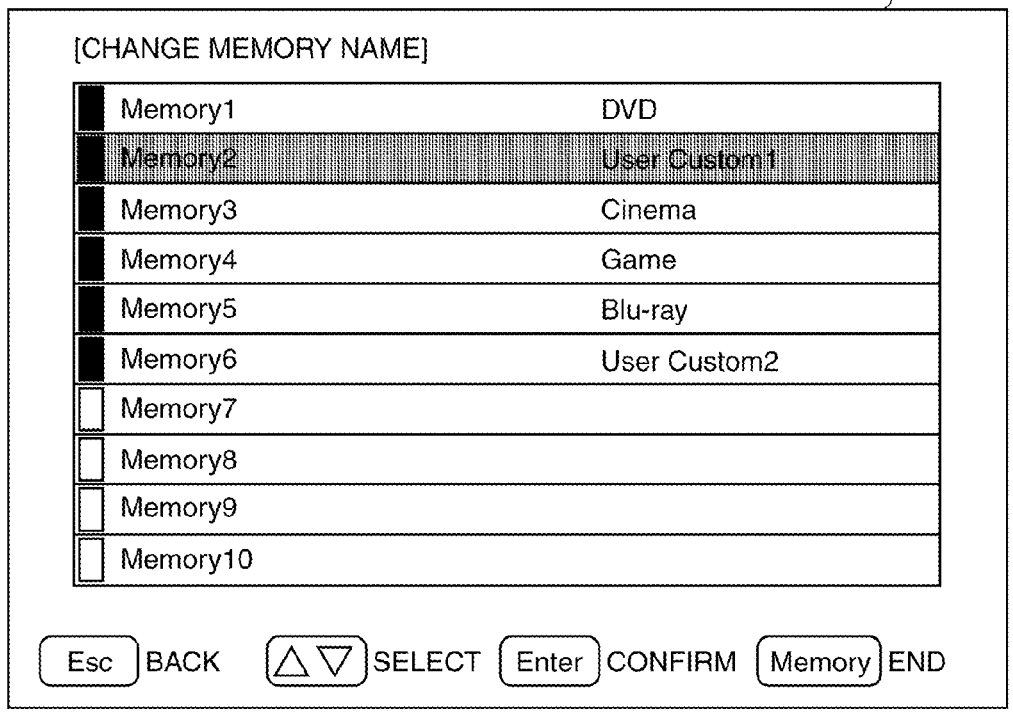
FIG. 13 is a diagram showing an example of a confirmation image according to the first embodiment.

After the set identification name data 142 is set, the projecting portion 190 projects a confirmation image (step S19). FIG. 13 is a diagram showing an example of a confirmation image 305 according to the first embodiment. When the identification name is changed, the confirmation image 305 shows the identification name before change and the identification name after the change. For example, in the example shown in FIG. 13, "Memory 2" is changed to "User Custom1".

Figure 14:
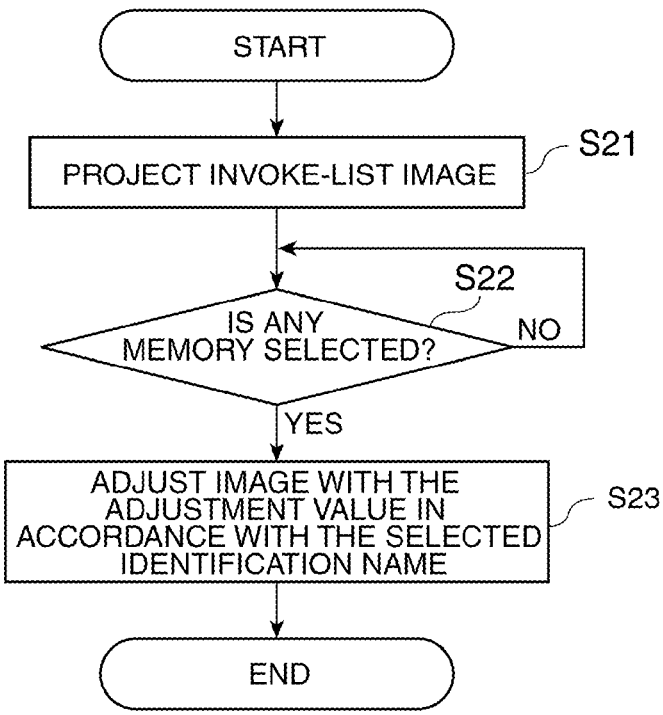
FIG. 14 is a diagram showing an example of the processing routine for invoking a memory according to the first embodiment.

Next, the case will be described in which a user selects "INVOKE MEMORY" on the projected memory image 300. FIG. 14 is a diagram showing an example of the processing routine for invoking a memory according to the first embodiment.

Figure 15:
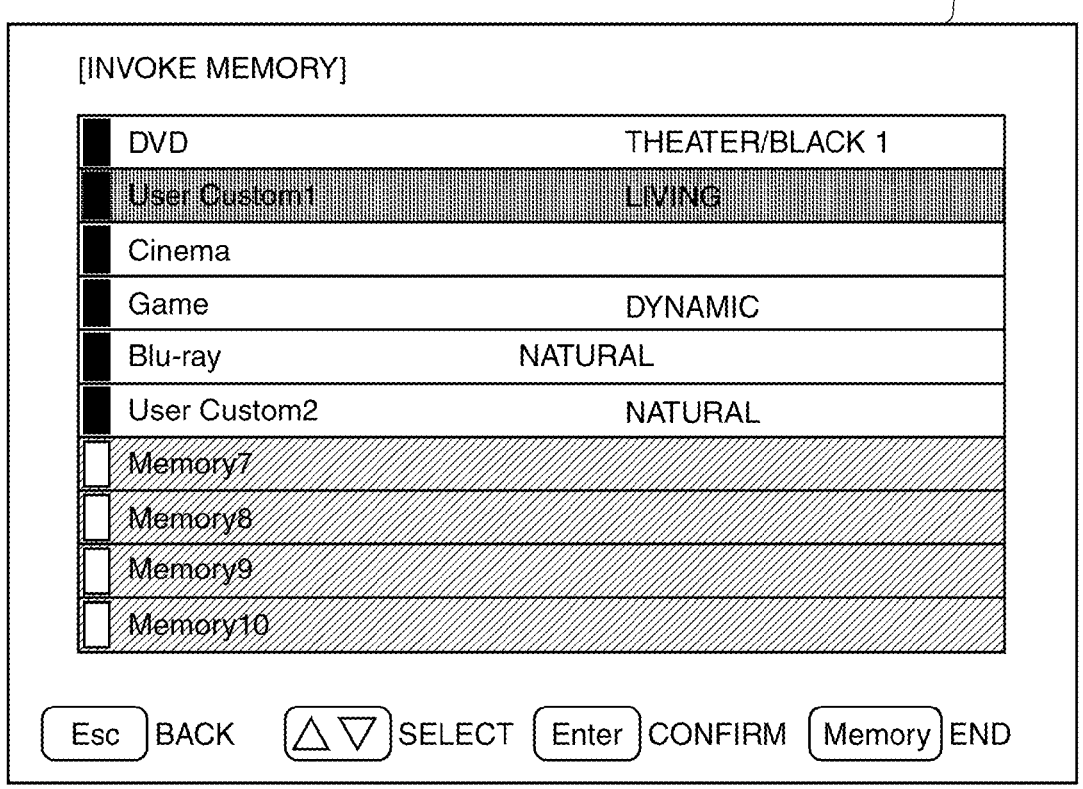
FIG. 15 is a diagram showing an example of an invoke-list image according to the first embodiment.

If a user selects "INVOKE MEMORY", the projecting portion 190 projects an invoke-list image (step S21). FIG. 15 is a diagram showing an example of an invoke-list image 306 according to the first embodiment. The invoke-list image 306 is displayed with an invokable identification name to be selectable (which is white at the background) and an unin-vokable identification name to be unselectable (which is shaded by the thin pattern in FIG. 15).

More specifically, for example, the image processing portion 136 creates the invoke-list image 306. The invoke-list image 306 applies the identification name of the initial identification name data 141 corresponding to the storage area for the identification name, which is changed from the identification name with the "VALIDITY FLAG" "01" in the set identification name data 142, on the basis of the initial identification name data 141, set identification name data 142 and menu image data 149. The image processing portion 136 may further create the invoke-list image 306, for example, showing the identification name corresponding to the storage area with the "VALIDITY FLAG" "01" for the adjustment value data 148 as selectable and the identification name corresponding to the storage area with the "VALIDITY FLAG" "00" for the adjustment value data 148 as unselectable.

The determining portion 132 determines whether any memory has been selected or not on the basis of the operation information (such as the selected identification name information describing the selected identification name) from the input portion 110 (step S22).

If some memory has been selected, the image adjusting portion 138 adjusts the image with the adjustment values according to the selected memory (under the input identification name) (step S23). More specifically, for example, if "Game" has been selected on the invoke-list image 306 in FIG. 15, the image adjusting portion 138 refers to the set identification name data 142, determines that "Game" is the identification name of the storage area 0003 and uses the adjustment value set for the storage area 0003 in the adjustment value data 148 to adjust the projecting image.

If a user selects "DELETE MEMORY" on the projected memory image 300, the update portion 134 sets the "validity flags" of all of the set identification name data 142 (or individually selected memory) to "00 (invalid)". Thus, the registration list image 301, for example, displays the initial identification name only.

Notably, the processing upon selection of "DELETE MEMORY" may be processing of deleting all of the registered records in the set identification name data 142 (that is, clearing the set identification names) or processing of, in addition to the processing, deleting all of the registered records in the adjustment value data 148 (that is, clearing set adjustment values), for example. The same processing may be performed for selecting and deleting an individual memory.

In order to return an individual set identification name to a initial identification name (such as "Memory 1"), a user may select "DEFAULT" on the identification name setting image 303. For example, when the set identification name of the storage area 0002 is "User Custom1", the determining portion 132 determines that "DEFAULT" has been selected for the storage area 0002. The update portion 134 sets the "VALIDITY FLAG" for the storage area 0002 in the set identification name data 142 to "00". Thus, the initial "Memory 2" is displayed as the identification name for the storage area 0002.

In this way, according to this embodiment, the projector 100 projects the identification name setting image 303 showing plural kinds of predetermined character strings as selectable to prompt a user to set an identification name. Thus, a user is allowed to more efficiently set the adjustment value for an projecting image, and the identification name may be stored properly. Hence, a user can easily identify what kind of adjustment has been performed, which can reduce the possibility of deleting or overwriting the adjustment values by mistake.

In addition, according to this embodiment, the projector 100 projects the character string setting image 304 so that a user can be allowed to set an arbitrary character string as an identification name. Thus, the ease-of-use for users can be improved.

According to this embodiment, the projector 100 receives the input of the character string setting information describing the setting of an arbitrary character string and updates the set identification name data 142. Thus, the identification name including the arbitrary character string by a user can be stored properly.

According to this embodiment, the image adjusting portion 138 adjusts an projecting image in accordance with the adjustment value set selected by the image adjusting portion 138. Thus, a user can select the identification name set by him or her to adjust the projecting image.

According to this embodiment, the projector 100 displays, on the invoke-list image 306, the identification name corresponding to the adjustment value set including a set adjustment value as selectable and displays the identification name corresponding to the adjustment value set including no set adjustment value unselectable. Thus, a user can select the identification name more efficiently in order to adjust the corresponding image. Furthermore, a user can easily grasp identification names, which are not set.

According to this embodiment, the projector 100 has a initial identification name and/or a initial adjustment value set in the initial identification name data 141. Thus, even when an instruction based on "DEFAULT" or "DELETE MEMORY", for example, is performed, the identification name or adjustment value can be returned to the initial value quickly and properly.

Second Embodiment

The projector 100 may project an identification name setting image showing a valid character string (which is an identification name) in the input source from which an image signal is input.

Figures 16, 17:
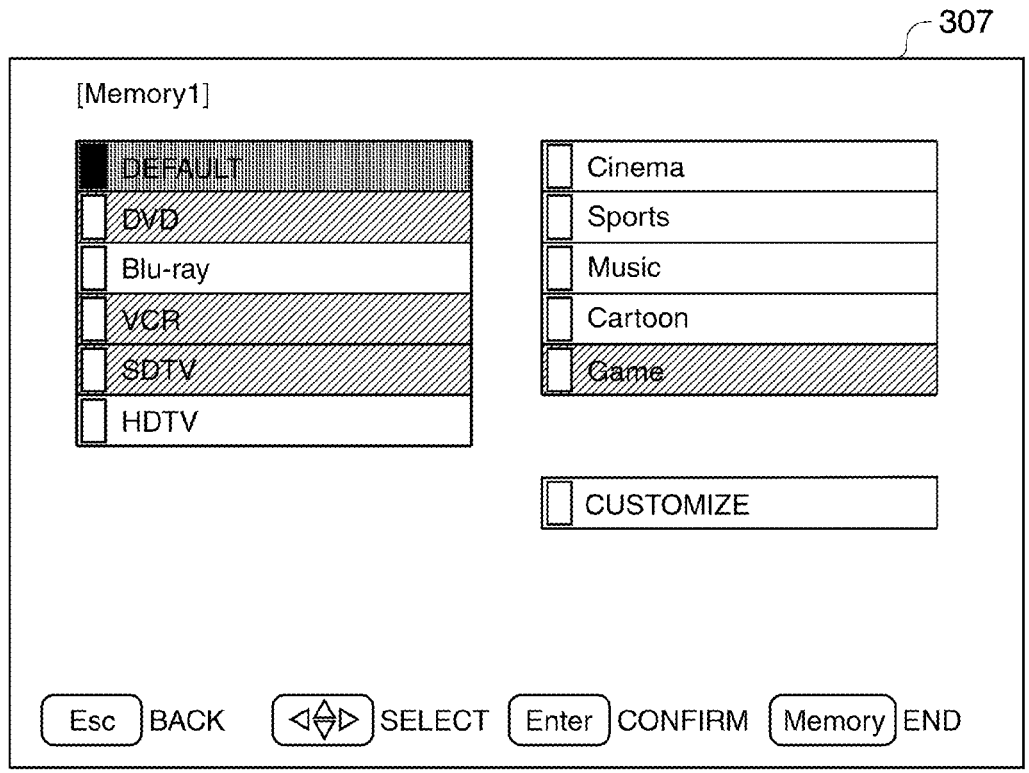
FIG. 16 is a diagram showing an example of an identification name setting image according to a second embodiment.
FIG. 17 is a diagram showing an example of predetermined character string data according to the second embodiment.

FIG. 16 is a diagram showing an example of an identification name setting image 307 according to the second embodiment. For example, when an image signal is input from an HDMI terminal 121, the projecting portion 190 projects the identification name setting image 307 showing a valid identification name in the HDMI terminal 121. When an image signal is input from the HDMI terminal 121, the identification name setting image 307 displays "HDTV", for example, as selectable and "DVD", for example, as unselectable.

FIG. 17 is a diagram showing an example of predetermined character string data 144 according to the second embodiment. In order to implement such a function, the predetermined character string data 144 has data ("valid input source") describing a valid input source for each identification name. For example, "valid input source" includes the HDMI when the "IDENTIFICATION NAME" is "Blu-ray", "HDTV", "Cinema", "Sports", "Music" or "Cartoon".

More specifically, the determining portion 132 determines the input source of an image signal on the basis of the image signal, for example, from the image signal input portion 120. The image processing portion 136 creates the identification name setting image 307 describing a valid character string (or an identification name) in the input source from which the image signal is input on the basis of the predetermined character string data 144, the menu image data 149 and the determination result on the input source by the determining portion 132. The projecting portion 190 projects the identification name setting image 307.

In this way, according to this embodiment, the projector 100 projects the identification name setting image 307 showing a valid character string in the input source. Thus, a user is allowed to set a character string based on the real operating environment as an identification name. Therefore, the user is allowed to set the adjustment value for the projecting image more efficiently, and the identification name can be stored properly.

Notably, like the predetermined character string data 144, the set identification name data may also include the "valid input source". Thus, the projector 100 allows a user to set the character string based on the real operating environment as the identification name even when the user is using an arbitrary character string as the identification name.

Other Embodiments

Notably, the application of the invention is not limited to the embodiments, but various changes and modifications may be made thereto. For example, the initial identification name may be given to the input source of an image signal.

Figure 18:
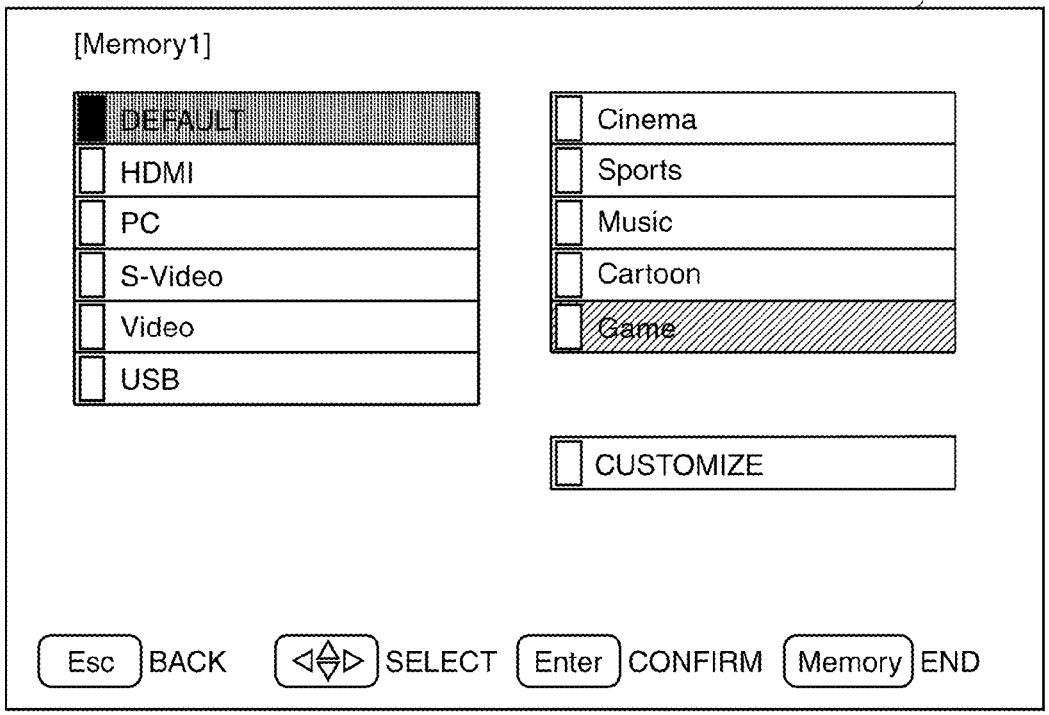
FIG. 18 is a diagram showing an example of an identification name setting image according to another embodiment.

FIG. 18 is a diagram showing an example of an identification name setting image 308 according to another embodiment. The identification name setting image 308 displays "HDMI", "PC", "S-Video", "Video" and "USB" indicating the input sources as selectable identification names. The implementation of the function may be allowed by the setting of those character strings as character strings for the predetermined character string data by a developer or user, for example.

Figure 19:
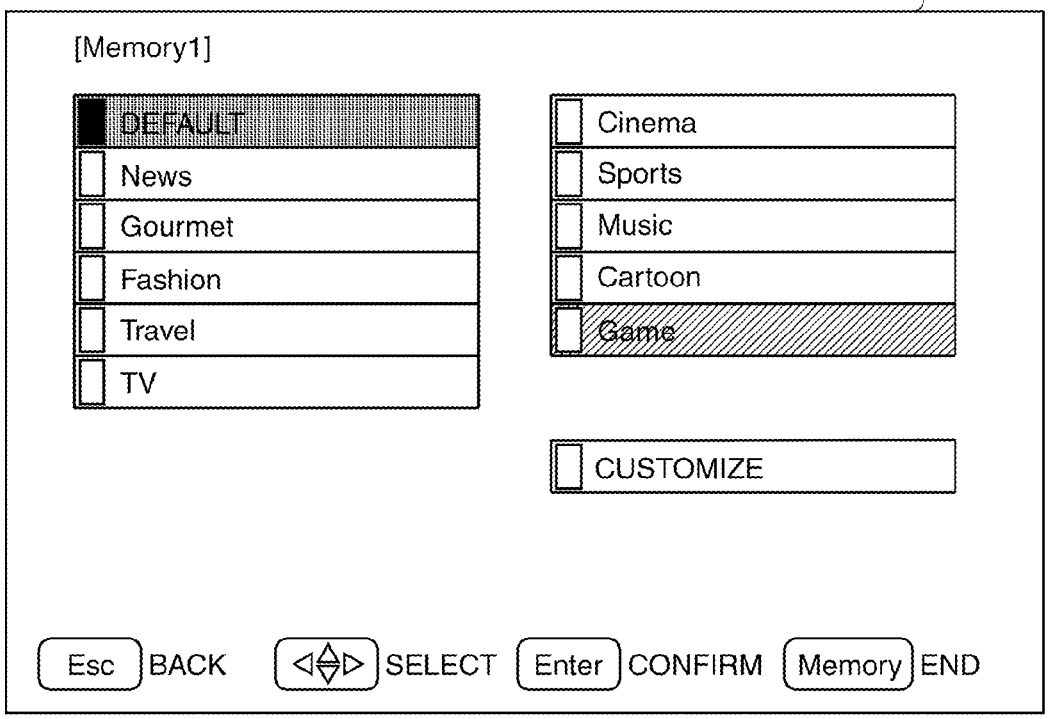
FIG. 19 is a diagram showing an example of an identification name setting image according to another embodiment.

The projector 100 may include a character string (or content) expected to be used in the input source of an image signal in the selections for the identification name setting image. FIG. 19 is a diagram showing an example of an identification name setting image 309 according to another embodiment. For example, when the input source is an HDMI, the identification name setting image 309 displays "News", "Gourmet", "Fashion", "Travel" and "TV" indicating the contents as selectable identification names.

The implementation of the function may be allowed by setting of the character strings in association with the valid input sources as character strings of the predetermined character string data 144 shown in FIG. 17 by the developer or user, for example.

The data architecture or data division in the initial identification name data 141, for example, shown in FIG. 2 to FIG. 5 and FIG. 17 is given for the illustration purpose only, and the invention is not limited to the details. For example, the initial identification name data 141 and the adjustment value data 148 may be integrated to initial identification name data. The character string in the predetermined character string data 143, for example, is not limited to the example shown in FIG. 4. A user or seller, for example, may set a desirable character string, or a developer, for example, may define it in accordance with a request by a user or seller, for example.

A part or all of the storage portion 140 may be a portable memory, such as a USB memory, removably attached to the projector 100. The projector 100 may include an input/output portion that can output the set identification name data 142, for example, to an external device and receive inputs from an external device. Thus, the projector 100 can improve the versatility and the ease-of-use by users.

According to the embodiments, the character string setting image 304 and a remote control are used to input character string setting information in the projector 100. However, without using the character string setting image 304 and/or a remote control, for example, the character string setting information may be input from a keyboard connecting to the projector 100 or a PC or a cellular phone communicable with the projector 100, for example.

The projector 100 is not limited to a liquid crystal projector, but it may be a projector having a DMD (Digital Micromirror Device), for example. Notably, DMD is a trademark of Texas Instruments in the U.S. The functions of the projector 100 may be distributed over plural apparatus (such as a PC and a projector).

What is claimed is:

1. A projector comprising:
    a storage portion that stores set identification name data describing a name of an adjustment value set including an adjustment value for projecting images, predetermined character string data describing plural kinds of predetermined character strings usable as the set identification name, and menu image data;
    a projecting portion that projects an identification name setting image showing the plural kinds of predetermined character strings as selectable on a basis of the predetermined character string data and the menu image data;

an input portion that receives identification name setting information describing a character string selected on the identification name setting image; and an update portion that updates the set identification name data on a basis of the identification name setting information.

2. The projector according to claim 1, further comprising a determining portion that determines an input source of an image signal, wherein:

the predetermined character string data includes data describing the input source which is valid for each of the character strings; and the projecting portion projects the identification name setting image describing a valid character string in the input source from which the image signal is input among the plural kinds of predetermined character string on the basis of the predetermined character string data, the menu image data, and a determination result on the input source by the determining portion.

3. The projector according to claim 1, wherein the identification name setting image includes a character string setting image for setting an arbitrary character string as the identification name.

4. The projector according to claim 3, wherein:

character string setting information describing the setting of the arbitrary character string is input from the input portion; and the update portion updates the set identification name data on the basis of the character string setting information.

5. The projector according to claim 1, further comprising an image adjusting portion that adjusts a projecting image in accordance with the adjustment value set, wherein:

the storage portion stores initial identification name data that describes an initial identification name of the adjustment value set;

the projecting portion projects an invoke-list image showing the identification name as selectable on a basis of the initial identification name data, the set identification name data, and the menu image data;

selected identification name information describing a selection of the identification name is input from the input portion; and the image adjusting portion adjusts the projecting image in accordance with the adjustment value set corresponding to the selected identification name on a basis of the selected identification name information.

6. The projector according to claim 5, wherein:

the storage portion stores adjustment value data describing the adjustment value set including set adjustment values;

the projecting portion projects on the invoke-list image the identification name corresponding to the adjustment value set including the set adjustment value as selectable and projects the identification name corresponding to the adjustment value set excluding the set adjustment value as unselectable on the basis of the initial identification name data, the set identification name data, the adjustment value data, and the menu image data.

7. A control method to control a projector, the method comprising the steps of:

storing set identification name data describing a set identification name of an adjustment value set including an adjustment value for projecting images, predetermined character string data describing plural kinds of predetermined character strings usable as the set identification name, and menu image data;

projecting an identification name setting image showing the plural kinds of predetermined character string as selectable on a basis of the predetermined character string data and the menu image data;

receiving an input of identification name setting information describing a setting of the identification name; and updating the set identification name data on a basis of the identification name setting information.

8. A computer program product embodied in a non-transitory computer readable medium and comprising instructions executable by a computer configured to control a projector including a storage portion, a projecting portion an input portion and an update portion, the instructions executable to perform the functions of:

a storage control portion that causes the storage portion to store set identification name data describing a set identification name of an adjustment value set including an adjustment value for projecting images, predetermined character string data describing plural kinds of predetermined character strings usable as the set identification name, and menu image data;

a projection control portion that causes the projecting portion to project an identification name setting image showing the plural kinds of predetermined character string as selectable on a basis of the predetermined character string data and the menu image data;

an input control portion that causes the input portion to receive input of identification name setting information describing a setting of the identification name; and an update portion that updates the set identification name data on a basis of the identification name setting information.

* * * * *